United States Patent
Wang

(10) Patent No.: US 7,058,784 B2
(45) Date of Patent: Jun. 6, 2006

(54) METHOD FOR MANAGING ACCESS OPERATION ON NONVOLATILE MEMORY AND BLOCK STRUCTURE THEREOF

(75) Inventor: Chih-Hung Wang, Yunlin Hsien (TW)

(73) Assignee: Solid State System Co., Ltd., Hsinchu (TW)

( * ) Notice: Subject to any disclaimer, the term of this patent is extended or adjusted under 35 U.S.C. 154(b) by 270 days.

(21) Appl. No.: 10/604,247

(22) Filed: Jul. 4, 2003

(65) Prior Publication Data

US 2005/0005057 A1 Jan. 6, 2005

(51) Int. Cl.
*G06F 12/02* (2006.01)
(52) U.S. Cl. ............ 711/171; 711/129; 711/170; 711/172; 711/173; 711/209; 711/3
(58) Field of Classification Search ............ None
See application file for complete search history.

(56) References Cited

U.S. PATENT DOCUMENTS

2002/0004813 A1 * 1/2002 Agrawal et al. ............ 709/201
2004/0123039 A1 * 6/2004 Berks et al. ................ 711/133

* cited by examiner

*Primary Examiner*—B. James Peikari
(74) *Attorney, Agent, or Firm*—Jianq Chyun IP Office

(57) ABSTRACT

A method for managing the access procedure for large block flash memory by employing a page cache block, so as to reduce the occurrence of swap operation is proposed. At least one block of the nonvolatile memory is used as a page cache block. When a host requests to write a data to storage device, the last page of the data is written into one available page of the page cache block by the controller. A block structure is defined in the controller having a data block for storing original data, a writing block for temporary data storage in the access operation, and a page cache block for storing the last one page data to be written.

11 Claims, 15 Drawing Sheets

| For 4 logical sectors, e.g. LAB0~3 | Page 0 |
| For 4 logical sectors, e.g. LAB4~7 | Page 1 |
| ⋮ | ⋮ |
| | Page 63 |

FIG. 9 (PRIOR ART)

| | Step 1 | Step 2 | Step 3 |
|---|---|---|---|
| Host behavior | Write LBA0,SC=1 Write LBA0,SC=1 | Sequentially write LBA1,SC=1 | Random write LBA0,SC=10 |
| Controller behavior based on prior algorithm | Write page0 of W block | Overwrite page0 Need swap operation | Overwrite page0 Need swap operation |
| Controller behavior based on this invention | Write page0 of page cache block | Write page1 of page cache block | Write page0~1 of W block and then write page 2 of page cache |

FIG. 15

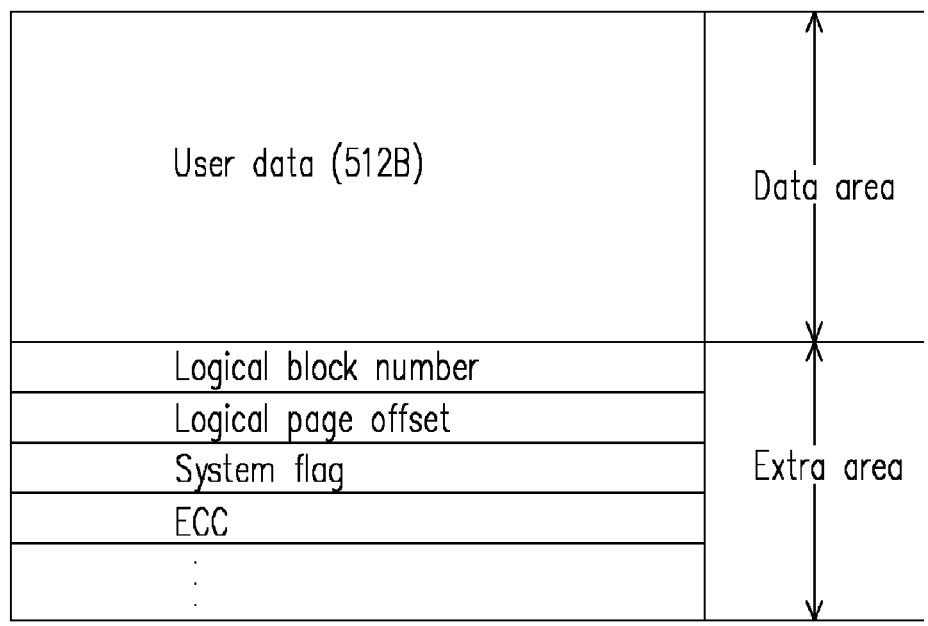

FIG. 16

METHOD FOR MANAGING ACCESS OPERATION ON NONVOLATILE MEMORY AND BLOCK STRUCTURE THEREOF

BACKGROUND OF THE INVENTION

1. Field of Invention

The invention is related to a controller management for a nonvolatile memory. Particularly, the present invention is related to a controller management for a big block nonvolatile memory.

2. Description of Related Art

Nonvolatile memory chips, which include nonvolatile memory arrays, have various applications for storing digital information. One such application is for storage of large amounts of digital information for use by digital cameras, as replacements for hard disk within personal computer (PCs) and so forth. Nonvolatile memory arrays are comprised of various types of memory cells, such as NOR, NAND and other types of structures known to those of ordinary skill in the art that have the characteristic of maintaining information stored therein while power is disconnected or disrupted.

FIG. 1 is a block diagram, schematically illustrating architecture of flash memory card. In FIG. 1, the host 100 can access data stored in a flash disk 102, in which the flash disk 102 includes a control unit 104 and a memory unit 106. A memory unit may include one or more memory chips. In access operation, the host 100 usually accesses the data in the memory module 106 via the control unit 104 at the requested address. In addition to communicating with the host, the control unit 104 also takes responsibility of managing the memory unit 106. The flash memory storage device is then configured as a drive by the host. FIG. 2 is a mapping table maintained by the control unit. From the host side, such a drive includes a plurality of logical blocks 108 arranged in the control unit 104, each of which can be addressed by the host. Namely, the host can access all the logical space including logical block 0, logical block 1, and logical block M−1.

A flash memory chip generally is divided into a plurality of storage units, like blocks which include one or more sectors. As shown in FIG. 2, the physical space of the flash memory module includes physical block 0, physical block 1, . . . , and physical block N−1. The logical space used by the host is always less than the physical space because some of the physical blocks may be defective or used by the controller for managing the flash memory module. One task of the controller is to create the logical space for host access. Indeed, the host can not directly address the physical space so that the controller must maintain the mapping relations between the logical blocks and the physical blocks. Such a mapping information is usually called as a mapping table and can be stored in the specific physical blocks or loaded into the SRAM within the controller. If a host asks for reading a particular logical block, the controller will look up the mapping table for identifying which physical block to be accessed, transfer data from the physical block to itself, and then transfer data from itself to the host.

FIG. 3A is a drawing, schematically illustrating the conventional mapping architecture. The data block and the writing block are formed and managed by the control unit. Each of them includes at least one physical block. In FIG. 3A, the logical block 300 is used by the host to write a data into the data block 302. However, since the overhead occurs from erase-then-program architecture, when the data will be re-written into the data block 302, the data is temporarily written to a writing block 304, instead. The writing block 304 also, functions as a buffer block or a spare block in the memory device. In other words, the writing block 304 in the usual accessing operation for the flash memory is severing as a buffer block for the host to write data instead of directly writing into the data block. The function of the data block is to store original data and the writing block is used as a temporary storage for the current write request from the host. When the writing block 304 is, for example, fully written, then a swap action between the data block 302 and the writing block 304 is necessary. FIG. 3B is a drawing, schematically illustrating how to recycle these blocks. The swap operation generally means that the writing block is newly allocated as a data block to take the role of the previously allocated data block. However, the replaced data block can be considered as an old block so that the old data block is erased and then becomes a spare block. The spare block can be recycled and then be allocated out to server as a current writing block if the control unit needs such a writing block for the host in responding to a write request.

Corresponding to the data block or the writing block, a sector structure is shown in FIG. 4. In one sector, it usually includes a data area 400, such as a size of 512 byte, and an extra area 402, which may include the information of logical block number, system flag, error correction code (Ecc), and so on. FIG. 5 is a drawing, schematically illustrating the mapping relation between the logical block 300, the data (D) block 302 and the spare (S) block 304. The spare block 304 can be allocated as the writing (W) block later. In FIG. 5, the logical block No. 0 maps to the data block 302 whose physical Block number is 5, and the spare block 304 is located at physical block No. 200h. The mapping table is divided into the logical area and the physical area. For example, the first row shows that the logical block No. 0 is corresponding to the data block No. 5, and the spare block No. 200h can be allocated to become a writing block for any one data block. If the host asks for writing sector LBA0 now, the spare block will be allocated to become a writing (W) block, as shown in FIG. 6. Moreover, a sector LBA0 will be written into the first position in the writing block. Now, the field for the first empty sector is filled by 1, which means that the first sector of the empty sectors in the writing block 304 is starting at offset 1 for storing LBA 1.

FIG. 7 is a drawing, schematically illustrating a data mapping relation after a swap action. Referring to FIG. 6, if the sector LBA0 is to be written again, a swap action is necessary in the conventional method. Because of the flash characteristic, data cannot be directly written into the writing block 304 whose physical block No. is 200h, so that a swap operation is needed. The swap operation causes time-consuming and reduces the system performance. In the swap operation, all the sectors except LBA 0 in data block must be moved to the currently-allocated writing block, and then the original data block (physical No. 5) will be erased so that the current writing block (physical No. 200) becomes the data block, as in FIG. 7. After swap operation, it still needs a writing block for the LBA 0 in write operation. The just erased physical block No. 5 can be used as the current writing block. Also, the other spare block can alternatively be used as the current writing block. Eventually, the LBA 0 data will be written into the current writing block and the mapping table should be updated, as shown in FIG. 7. Here, this kind of situation for writing is called a random write.

FIG. 8 is a drawing, schematically illustrating the access sequence in the conventional method. After writing to the LBA0, as shown in FIG. 6, the host requests to write LBA1.

The controller will directly write LBA1 into the next page of 512+16 bytes. Such kind of host side in sequential write will not result in a random write in flash memory side.

FIG. 9 is a drawing, schematically illustrating the block structure of a new-type flash memory having large blocks. For this type of large block flash memory, usually, one block 500 includes, for example, 64 pages, and each page has four sectors by a size of 2048+64 bytes. Page is the basic unit to be programmed. The writing sequence is similar to the small size flash memory. FIG. 10 is a drawing, schematically illustrating the writing procedure for the large block flash memory. In FIG. 10, the logical block 600 has 64 logical pages, and each logical page has four logical sectors; each logical sector size is 512 bytes for storing user data. Likewise, the data block 602 and the writing (W) block 604 have 64 pages, and each page has four sectors; each sector size is 528 bytes for storing user data and extra data. The arrangement is similar to the small size flash memory except block size and page size. When the host requests to write to sector LBA0, then the controller will program entire page0 due to page-based programming operation. Thereby, the original sectors LBA1–LBA3 will be transferred from the D block 602 into the controller, and then host data LBA0 accompanying with LBA1–LBA3 are together written into page 0 of the W block 304. The mapping table stores the status after programming. The empty pointer indicates offset 1 of the W block 604 is the first blank page.

When the host requests to write to sector LBA1, then the controller has to program page 0 again, since the sector LBA1 is a part of the page 0 for the large block. In this situation, a swap operation occurs for this write operation. In FIG. 11, the swap operation is performed between the data block 5 and the W block 200h, in comparison with FIG. 10.

As previously discussed, the swap operation will reduce the operation speed. However, the conventional management method between the logical block 600, data block 602, and the W block 604 causes the swap operation rather often for the large block flash memory. If the occurrence of swap operation can be reduced, the operation speed certainly can be improved.

SUMMARY OF THE INVENTION

The invention provides a method for managing the access procedure, so as to reduce the occurrence of swap operation.

The invention provides a method for managing the access procedure by employing a page cache block, so as to reduce the occurrence of swap operation.

As embodied and broadly described herein, the invention provides a method for managing all access procedure for a large block flash memory, comprising using at least one block as a page cache block. When a host requests to write a data, the sector data belonging to the last page of the requested data to be written is written into the page cache block. Each page includes multiple sectors.

The invention also provides a block structure for a large block flash memory, comprising a logical block, a data block, a W block, and a page cache block. The page cache block stores content of the last page of the total data size to be written, in which one page includes multiple sectors. Here, if there the total data size is smaller than or equal to one page size, this page is the also equivalent to the last page, and the whole data are only written to the space of the cache page. If the total data size is larger than one page size, the portion other than the last page is written into the space of the writing block W.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 9 is a drawing, schematically illustrating the block structure of a new-type flash memory having large block.

FIG. 15 illustrates the comparison between the conventional writing operation and the writing operation of the invention.

FIG. 16 is a drawing, schematically illustrating a sector structure for a page cache block, according to the preferred embodiment of the invention.

DESCRIPTION OF THE PREFERRED EMBODIMENTS

The invention provides a method for managing an access procedure for a large block flash memory, comprising using at least one block as a page cache block. When a host requests to write a data, the sector data belonging to the last page of the requested data to be written is written into the page cache block. Each page includes multiple sectors.

Recently, the large nonvolatile memory, such as a large block flash memory, has been proposed. For the large nonvolatile memory, one block has multiple pages and each of the pages has multiple sectors. For example, the page size has 4 physical sectors. In his manner, page is the basic unit for flash programming. From system point of view, the corresponding 4 logical sectors have to be programmed into flash memory at the same time. However, the host doesn't always request to write sequential 4 logical sectors. Eventually, some sequential write in host may result in a random write so that the whole system performance will be down. This invention proposes a page cache block, for storing the last one page data to be written. In this manner, since the page cache block separately stores the page, the frequency of swap operation can be effectively reduced. As a result, the system performance can be effectively improved. An example is provided for descriptions about the features of the invention.

Figure 12:
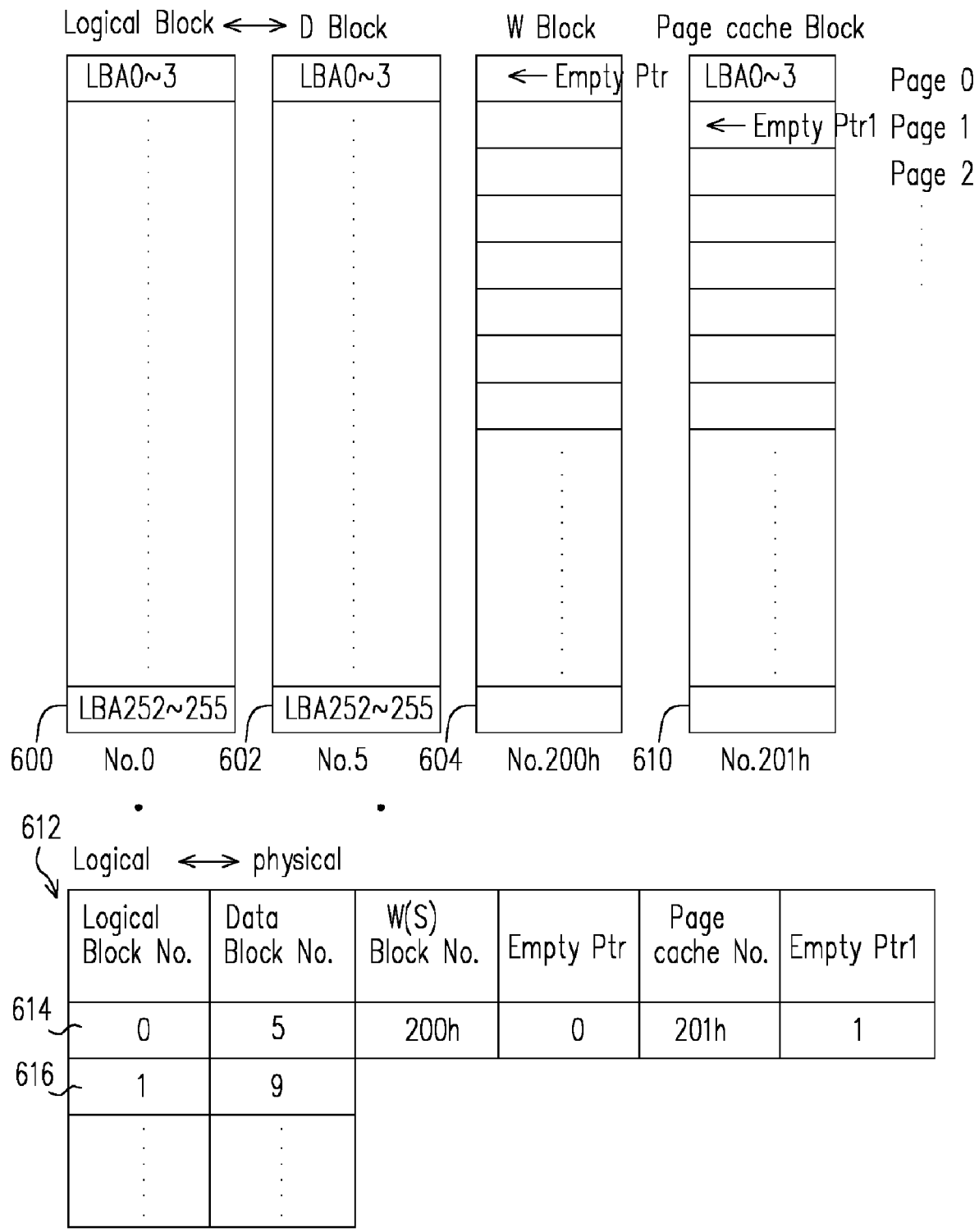
FIG. 12 is a drawing, schematically illustrating the block structure and the mapping table in a flash memory with a type of large block, according to the preferred embodiment of the invention.

FIG. 12 is a drawing, schematically illustrating the block structure and the mapping table in a flash memory with a type of large block, according to the preferred embodiment of the invention. The block structure of the large nonvolatile memory, according to the invention, includes multiple blocks, like a data block 602, a writing (W) block 604, and a page cache block 610. Also, they correspond to a specific logical block 600. The logical block 600, the data block 602, the writing block 604 are used like the conventional arrangement for the access operation, such as the writing operation. The present invention particularly introduces the page cache block 610 that is associating with the writing block 604, for storing the last page of data, which is intended to be written to the writing block in the conventional access manner.

For example, when the sector LBA 0 is to be programmed, the sector LBA 0 accompanying with sectors LBA1–LBA3 as a page 0 is to be written into the writing block 604. However, since this page is the only one page to be written, the page itself is also the last page of the data to be written to the writing block 604. Then, according to the present invention, this page including the sectors LBA0–LBA3 is directly written into the page cache block. Assuming that the writing block 604 and the page cache block are empty at the beginning state, then the page including the data, relating to the sector LBA0 is written into the space of page 0. Then, the mapping table 612 marks the empty page pointer (empty Ptr1) in row 614 to be 1. The use of mapping table has been known by the skilled artisans, and is not further described.

Figure 13:
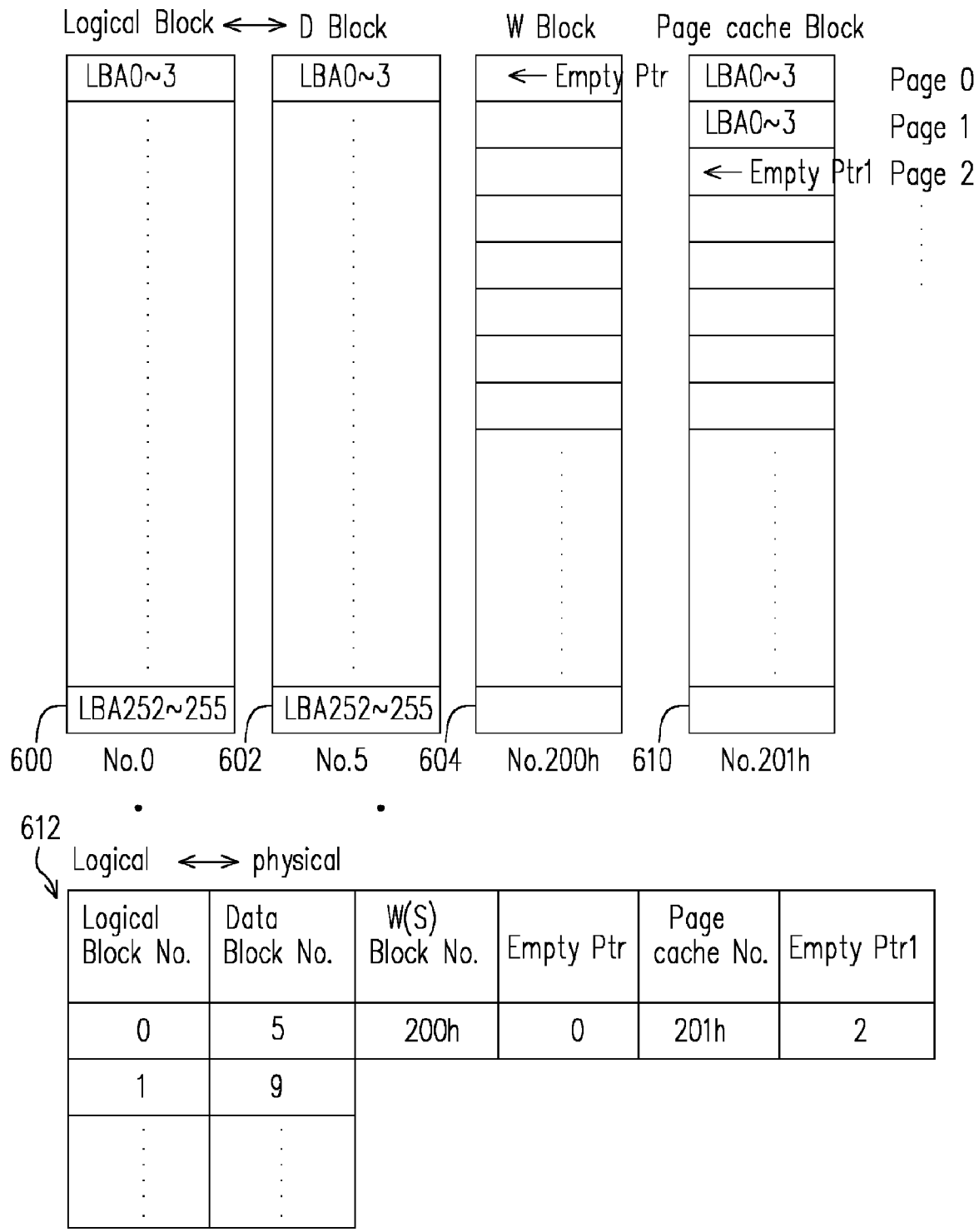
FIGS. 13–14 are drawings, schematically illustrating a writing operation to the flash memory with a type of large block, according to the preferred embodiment of the invention.

In a next write operation as shown in FIG. 13, when the host requests to write data into any one of the sectors LBA0–LBA3. such as LBA1, since the large block uses the page as the unit, the page is again written to the page 1 of the page cache block 610. In this situation, since the data stored in sectors LBA0, LBA2, and LBA3 are not changed, those data are just copied without change. In the invention, the swap operation is not necessary. However, the swap operation is necessary in the conventional method. This kind of situation for the host to sequentially write the sector occurs quite often. Therefore, the invention can effectively reduce the swap operation.

In general, if the data size is within the size of one page, such as less than or equal to four sectors in the example, the data needs not to distribute to next page or alternatively cross a page. In this case, the page is directly written into the page cache block. This is because the page by itself is the last page, according to the present invention. For example, if the sectors LBA1–LBA3 are to be written or programmed, the page including the sectors LBA0–LBA3 is directly written into page cache block 610.

Figure 1:
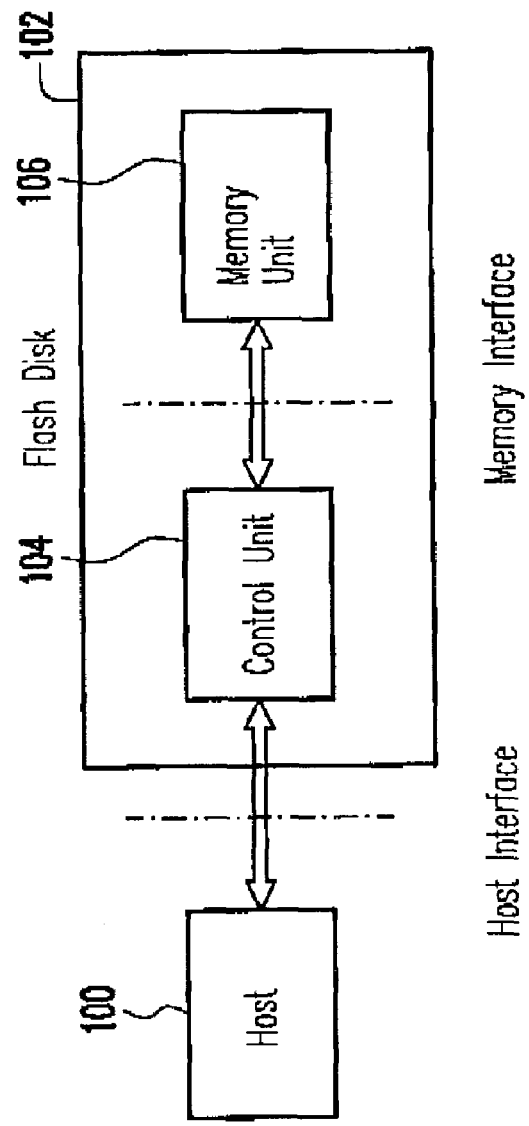
FIG. 1 is a block diagram, schematically illustrating architecture of flash memory card.
Figure 2:
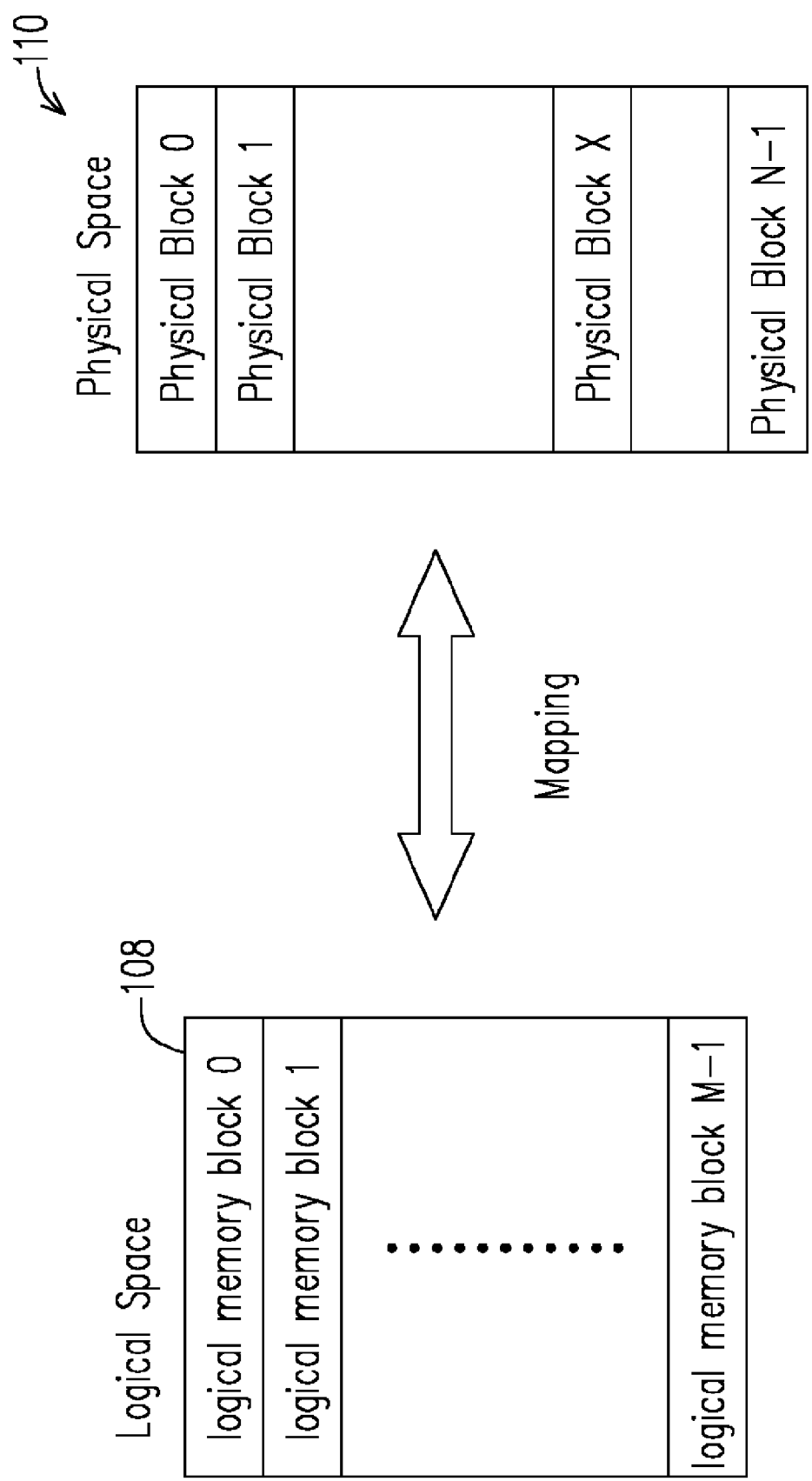
FIG. 2 is a mapping table.
Figure 3A:
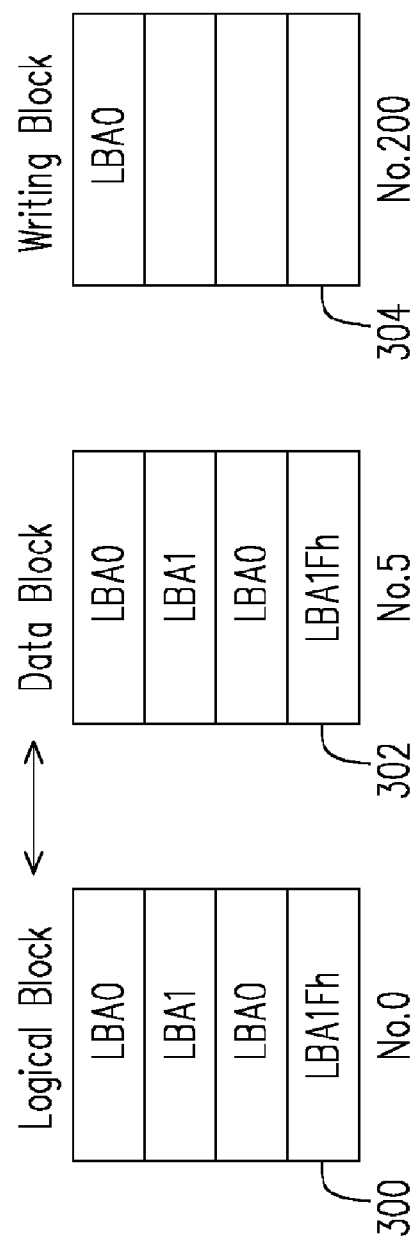
FIGS. 3A–3B are drawings, schematically the conventional mapping architecture and how to recycle.
Figure 3B:
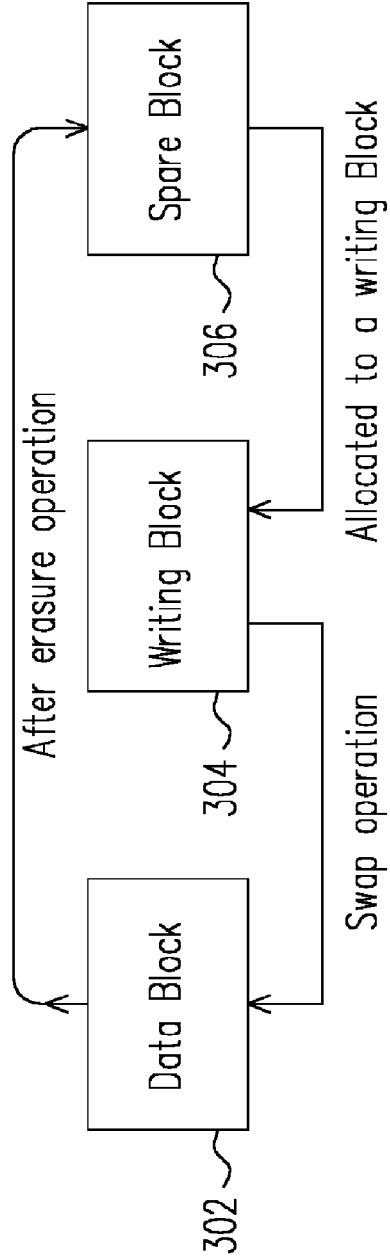
Figure 4:
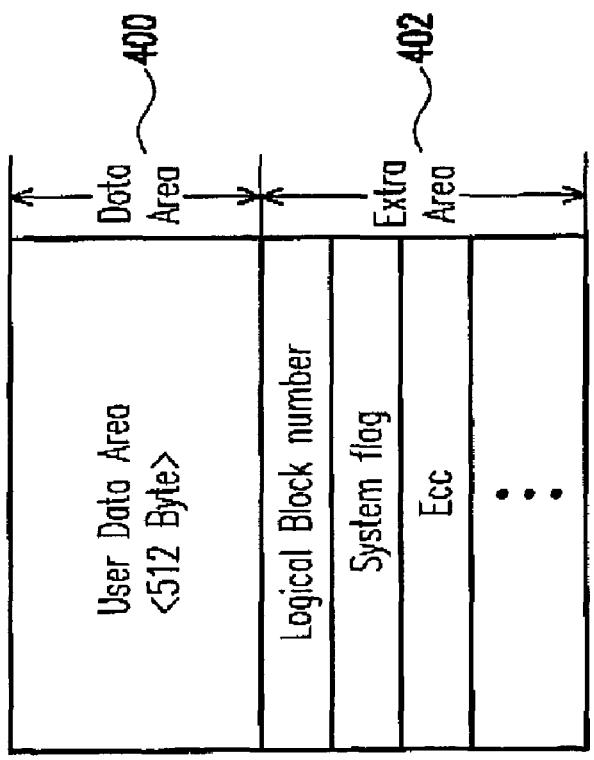
FIG. 4 is a drawing, illustrating a sector structure.
Figure 5:
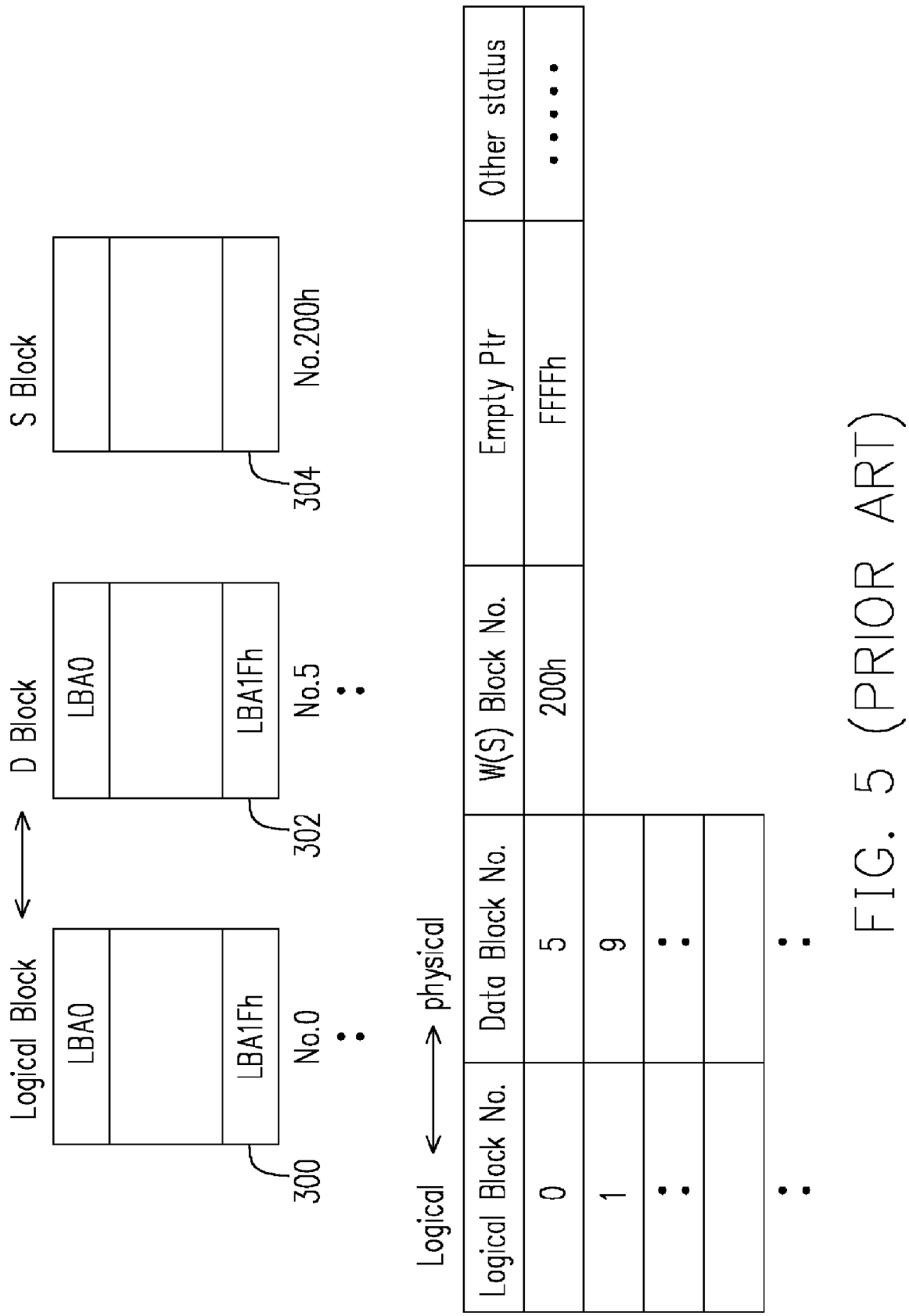
FIG. 5 is a drawing, schematically illustrating the mapping relation between the logical block, the data block and the spare block.
Figure 6:
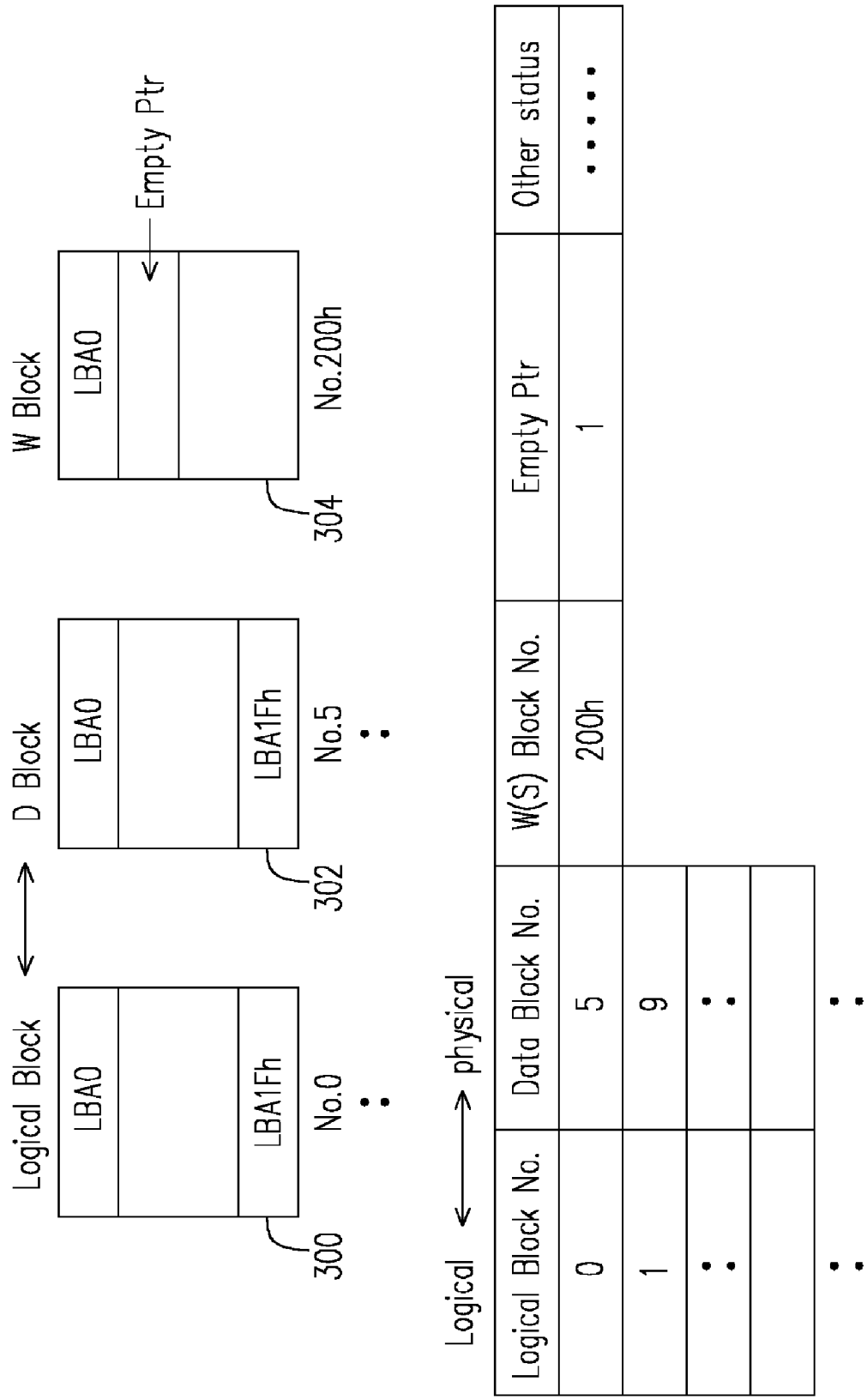
FIG. 6 is a drawing, schematically illustrating the mapping table associating with the logical block, the data block, and the writing block.
Figure 7:
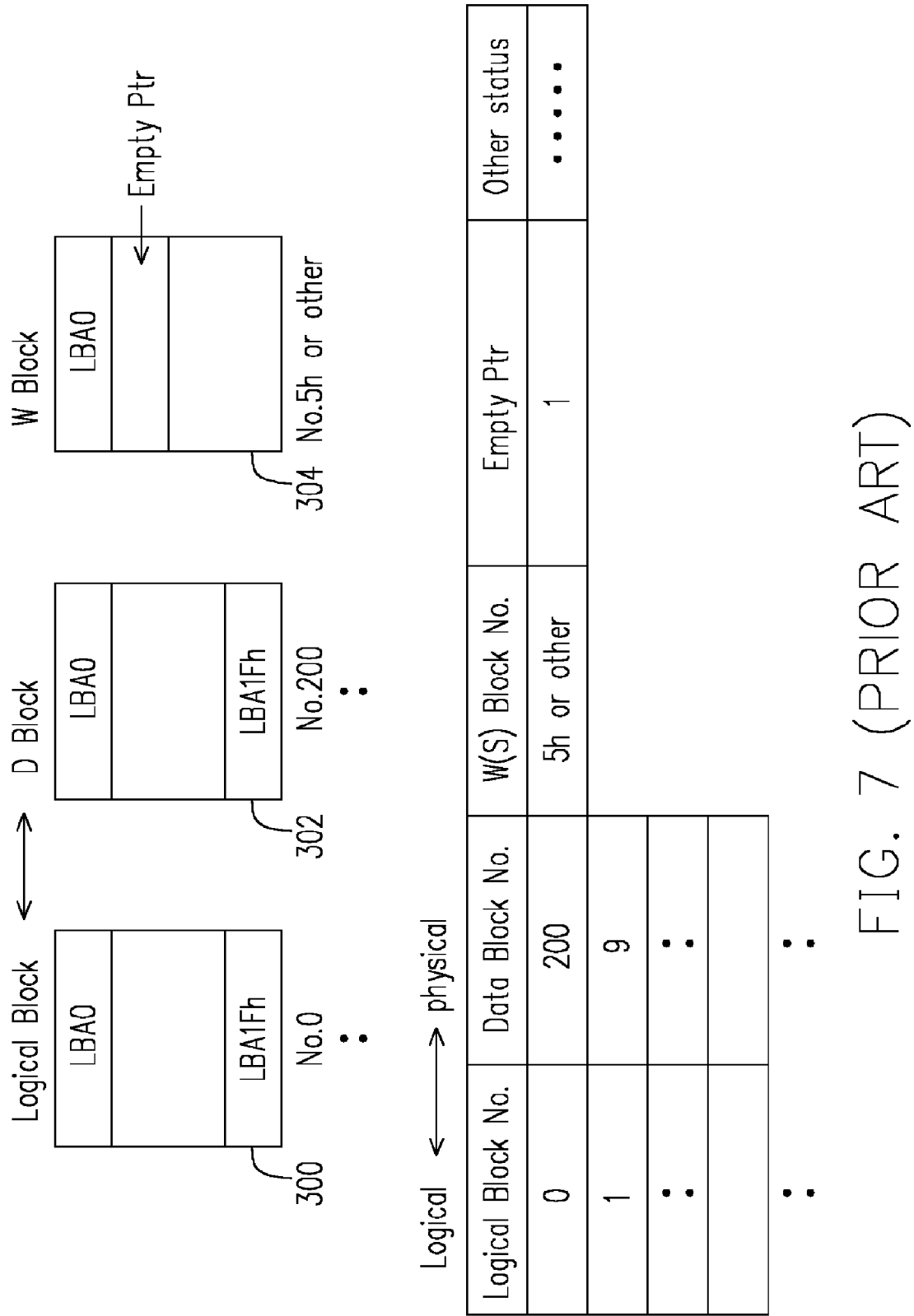
FIG. 7 is a drawing, schematically illustrating a data mapping relation after a swap action.
Figure 8:
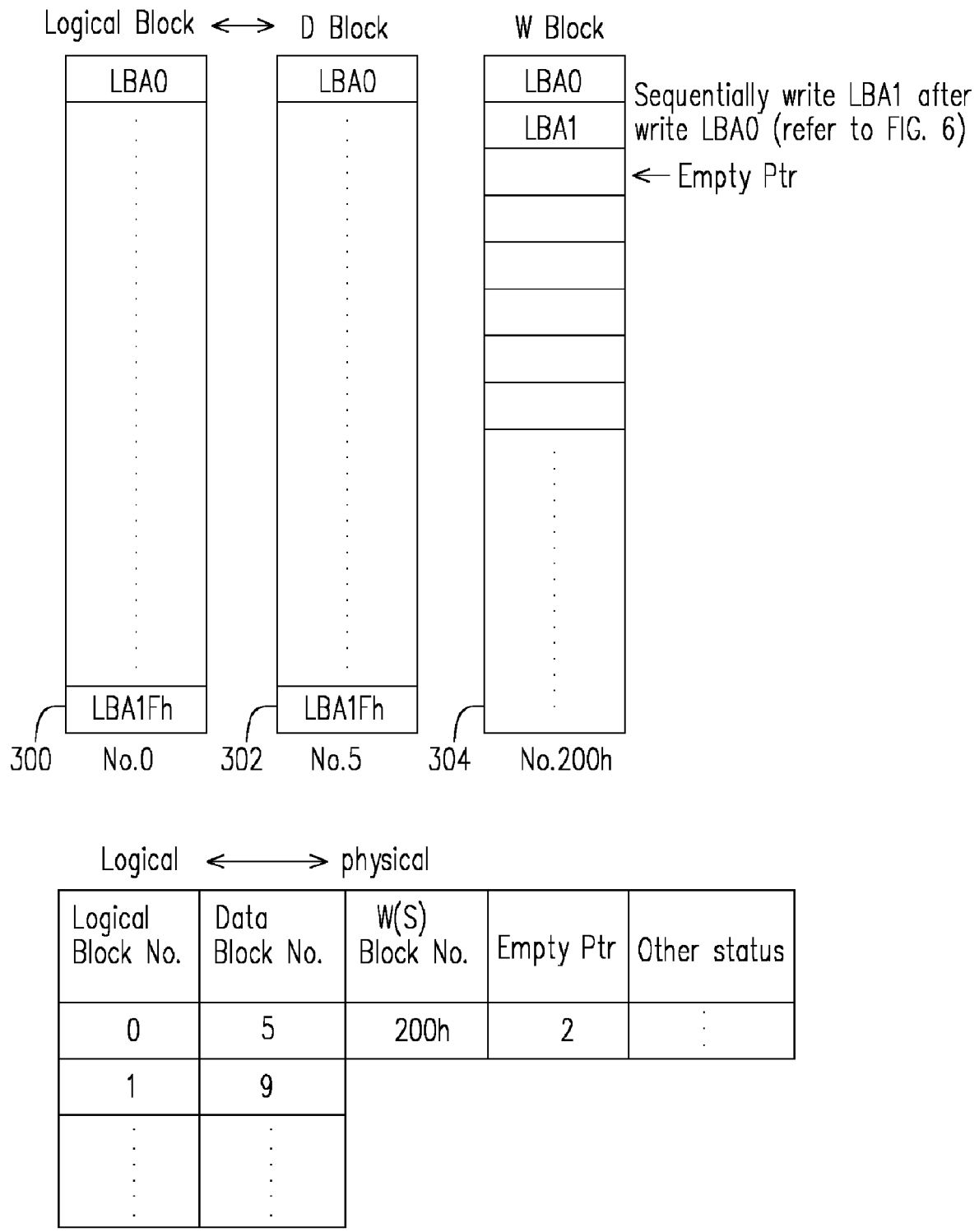
FIG. 8 is a drawing, schematically illustrating the access sequence in the conventional method.
Figure 10:
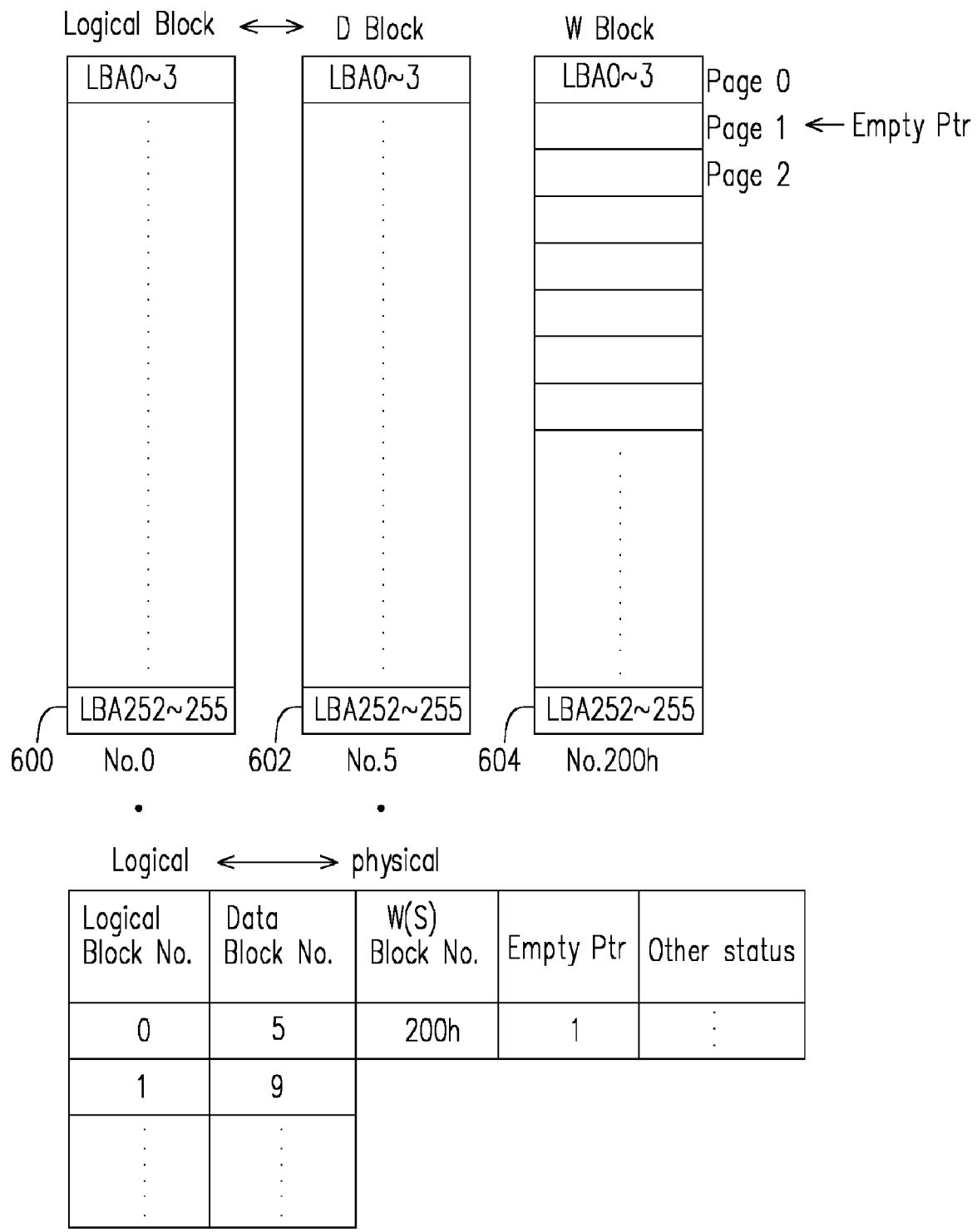
FIG. 10 is a drawing, schematically illustrating the block structure and the mapping table in a flash memory with a type of large block.
Figure 11:
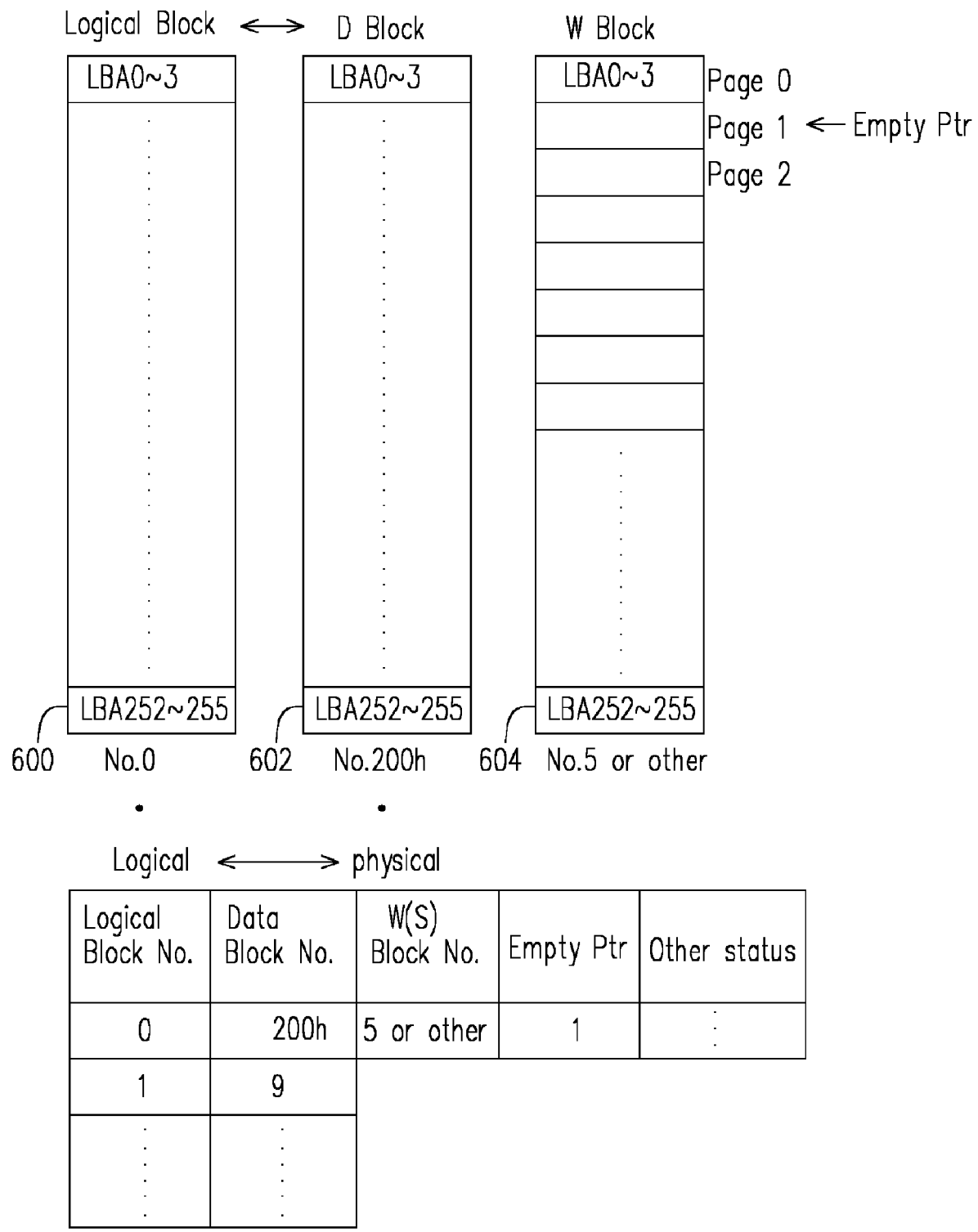
FIG. 11 is a drawing, schematically illustrating a writing operation to the flash memory with a type of large block.

In comparing with the conventional writing operation as shown in FIG. 10 and FIG. 11, the conventional write operation needs a swap action between the data block and the writing block, in which the block address No. 5 and No. 200h have been swapped. In the invention, the swap action is not necessary.

Figure 14:
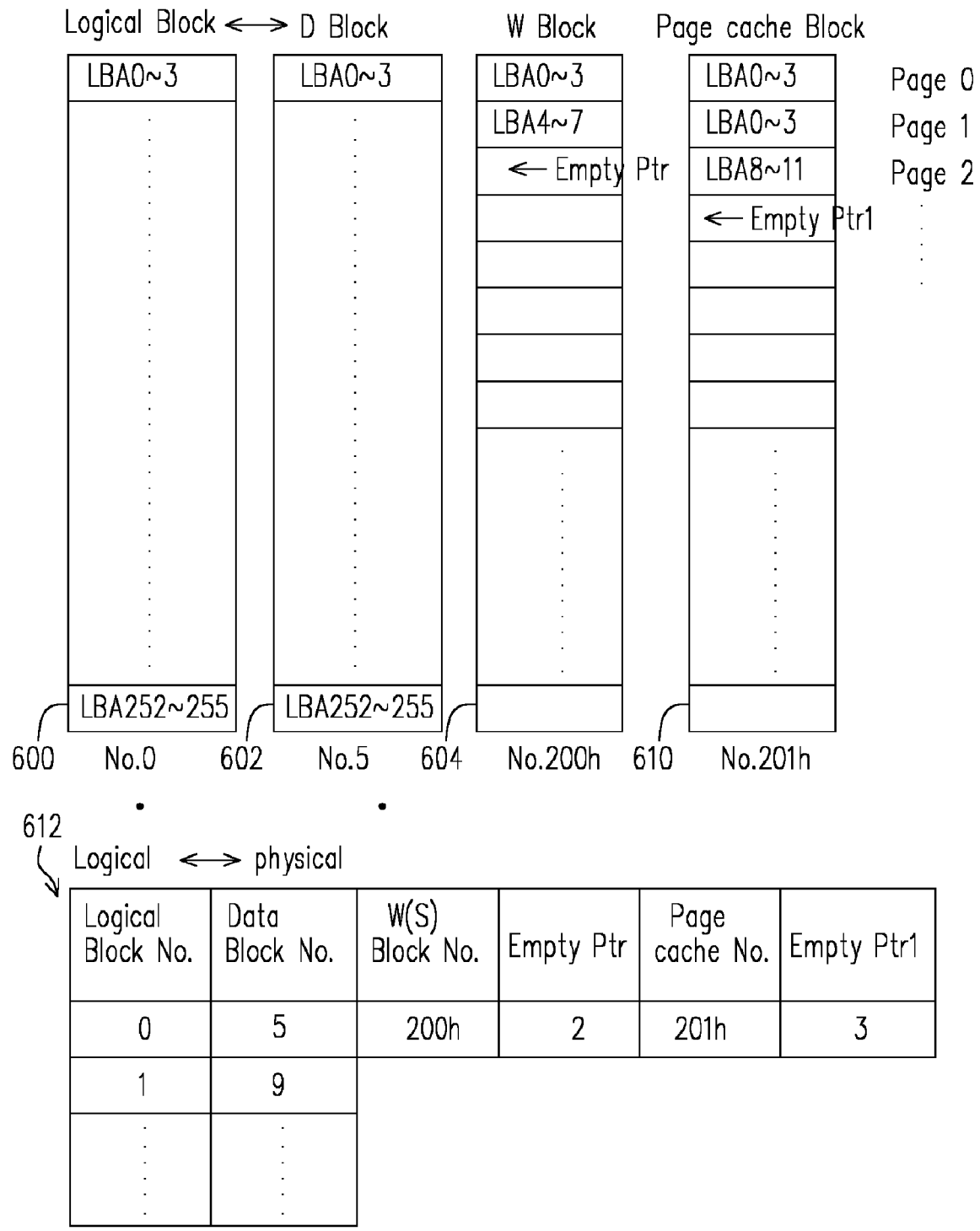

Furthermore, in FIG. 14, if another sector LBA9 is requested by the host, the page 0 and page 1 respectively including the sectors LBA0–LBA3 and LBA4–LBA7 are written to the writing block 604 by copying from D block 602. However, the sector LBA9 belongs to the last page including the sectors LBA8–LBA11. Therefore, the last page including sectors LBA8–LBA11 is written to the page cache block at page 2.

For another situation, for example, the host requests to write 10 sectors (SC=10, SC means the sector count) staring from sector LBA0, after the writing operation in FIG. 13. This situation is usually called a random write, and it needs a swap operation in the conventional method because the overwriting to the previous page, such as page 0, occurs. However, in the invention, since the data with 10 sectors spread over three pages, the first two pages are written to the writing block 604 and the last page is written to the page cache block 610. The swap operation is not necessary in the invention.

In general, when the data has a size larger than four sectors, the data distributes over at least two pages. In this situation, the writing operation needs to at least cross one page. Then, the front part page(s) of the data is written to the writing block 604, and the last page of the data is written to the page cache block 610. In other words, the last page of the data can be the page itself if the data is not necessary to cross the page, or the last page of data includes the last four sectors of data.

in the present invention, most of the conventional access management can still remain. The only need is to arrange the page cache block to store the last page of data corresponding to the writing block. In this manner, the present invention can effectively reduce the frequency of the swapping operation, and is not difficult to be implemented into the large nonvolatile memory. As a result, the performance of the large nonvolatile memory with the block structure of the present invention can be effectively improved.

FIG. 15 shows the improvements of the invention corresponding to the three steps of write operations as the example. In the step 1, the sector LBA0 is requested by sector count (SC)=1. Then, the page 0 is written to the writing block in the conventional method. In the invention, the page 0 is written to the page cache block. The advantages of the invention are not significantly seen yet in step 1. However, in step 2, the sector LBA1 is requested with SC=1. In the conventional method, since the sector LBA1 is still belonging to the page 0, page 0 is necessary to be overwritten, and a swap operation is therefore necessary. In the invention, since the new page 0 as the last page is written to the page cache block, the swap operation is not necessary.

Further in step 3, a random-write access is requested by the host. For example, 10 sectors (SC=10) are requested starting from the sector LBA0. Since the sector LBA0 belongs to the page 0, the page 0 should be overwritten. In this situation, the swap operation is necessary for the conventional method. However, in the present, the page 0 and the page 1 are written to the writing block and the last page 2 is written to the page cache block. There is no overwriting situation occurring. The swap operation in the invention is not necessary.

FIG. 16 is a drawing, schematically illustrating a structure for a page cache block, according to the preferred embodiment of the invention. The page of the page cache block includes, for example, four sectors. The sector structure includes, for example, 512 bytes as the data area and 16 bytes for the extra area. The extra area stores the basic information, such as logical block number, logical page offset, system flag, ECC, . . . , and so on.

It will be apparent to those skilled in the art that various modifications and variations can be made to the structure of the present invention without departing from the scope or spirit of the invention. In view of the foregoing, it is intended that the present invention covers modifications and variations of this invention provided they fall within the scope of the following claims and their equivalents.

The invention claimed is:

1. A method for managing an access operation for a nonvolatile memory having a plurality of blocks that includes a data block for storing original data, and a writing block for temporary data storage in the access operation, wherein each of the blocks has a plurality of pages and each of the pages has multiple sectors, the method comprising:
    setting at least one of the blocks as a page cache block; and
    when a host requests to write a data to a storage device, and a size of the data distributes over at least one page, writing at least a portion of the data distributed in a last page of the at least one page into the page cache block.

2. The method of claim 1, wherein if the size of the data is not larger than a page size, the data is directly written into the page cache block.

3. The method of claim 1, wherein if the size of the data distributes at least two pages, the portion of the data distributed in the last page is written to the page cache block while the other portion of the data is written into the writing block.

4. The method of claim 1, wherein if the data is to be written to a sector belonging to a specific page, and at least one previous page before the specific page has not yet been written into the writing block with the corresponding data, then the at least one previous page is copied from the data block into the writing block and the specific page is written to the page cache block.

5. A block structure for a nonvolatile memory that has a plurality of blocks including a data block, and a writing block for temporary data storage in an access operation, wherein each of the blocks has multiple pages, and each of the pages has multiple sectors, the block structure further comprising:
    a page cache block, used for storing at least a last portion of a data, being requested by a host to write to a storage device in the access operation, wherein the data is distributed over at least one page and the last portion of the data is distributed to a last page of the at least one page.

6. The block structure of claim 5, wherein if the data has a size within a page size, the data is stored in the page cache.

7. The block structure of claim 5, wherein another portion of the data requested by the host other than the last portion of the data is temporarily stored in the writing block.

8. The block structure of claim 5, wherein the writing block is used for temporarily storing the data, requested by the host to write to the storage device.

9. The block structure of claim 5, wherein the writing block and the data block can be swapped when the writing block is fully written.

10. The block structure of claim 5, wherein if a size of the data is within a page size, the whole data is belonging to the last page and is directly written into the page cache.

11. The block structure of claim 5, wherein if a size of the data is greater than a page size, only a portion of the data distributed in the last page of the at least one page is stored into the page cache block.

* * * * *